United States Patent [19]

Fischer et al.

[11] Patent Number: 5,060,958
[45] Date of Patent: Oct. 29, 1991

[54] POWER DRIVE AND TRANSMISSION UNIT FOR SELF CENTERING CLAMPS AND CHUCKS

[75] Inventors: David Fischer, Aschaffenburg; Rudolf Kohlert, Stockstadt, both of Fed. Rep. of Germany

[73] Assignee: Roemheld GmbH, Laubach, Fed. Rep. of Germany

[21] Appl. No.: 506,672

[22] Filed: Apr. 9, 1990

[51] Int. Cl.⁵ .................... B23B 31/30; B23Q 3/08
[52] U.S. Cl. .......................... 279/4; 269/32; 269/233; 279/1 L; 279/110
[58] Field of Search ............. 269/26, 32, 34, 233; 279/1 L, 110, 114, 16, 17, 4

[56] References Cited

U.S. PATENT DOCUMENTS

| | | | |
|---|---|---|---|
| 1,909,681 | 5/1933 | Jackson | 269/32 X |
| 2,158,058 | 5/1939 | Godfriaux | 279/110 X |
| 3,589,741 | 6/1971 | Germain, Jr. | 279/110 X |

Primary Examiner—Steven C. Bishop
Attorney, Agent, or Firm—Ralf H. Siegemund

[57] ABSTRACT

A power drive and transmission unit for self centering clamps and chucks has a housing with a cylindrical bore and a piston which is rotatably mounted therein and is acted upon by two linear operating, piston cylinder drives to obtain rotation of the rotating piston in one or the opposite direction. Two or three linearly moving central slide elements which are mounted on said housing for obtaining the centering chuck action elements are connected to the rotating piston by means of pins running in oblong slots in order to convert the rotation of the rotating piston into oppositely linear motion of the slide elements, so that they move towards or away from a common center depending on the direction of rotation of the rotating piston.

18 Claims, 3 Drawing Sheets

SECTION A-A

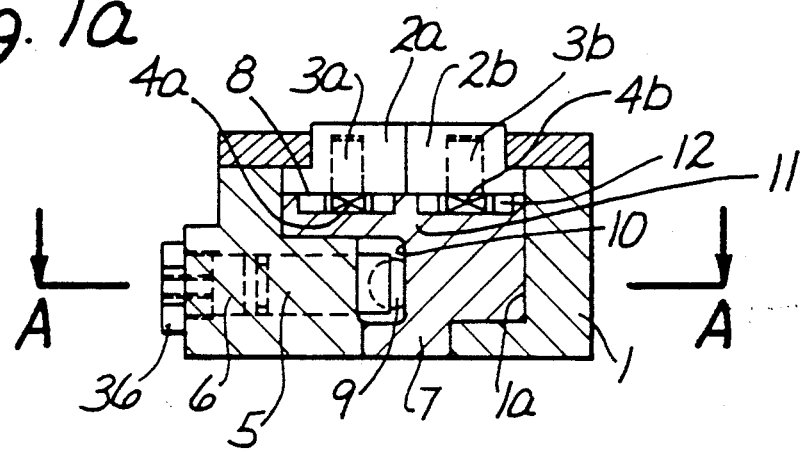
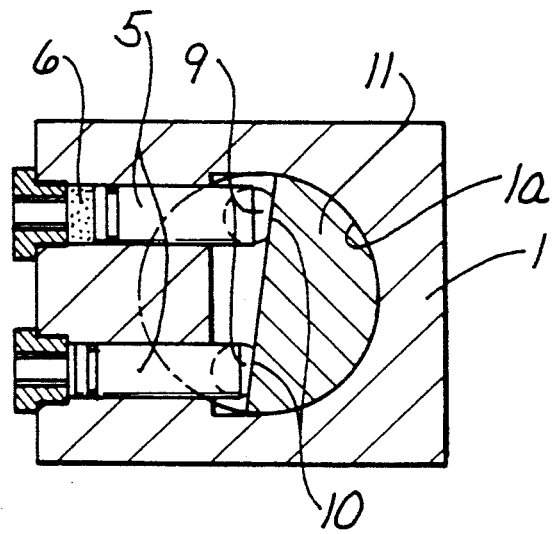
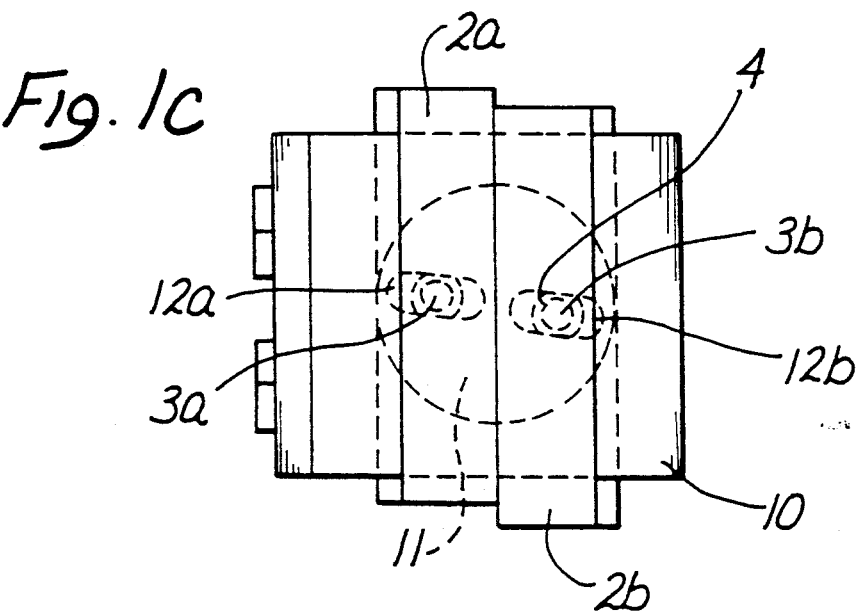

POWER DRIVE AND TRANSMISSION UNIT FOR SELF CENTERING CLAMPS AND CHUCKS

BACKGROUND OF THE INVENTION

The present invention relates to construction apparatus and structure for clampingly orienting and centering work pieces for purposes of further work and more particularly but not exclusively the invention relates to improvements in lathes as well as in stationary work tools with emphasis on the latter.

The following equipment is known for clampingly holding and supporting workpieces in a centering or self-centering fashion. A centering vise is known wherein the centering clamping results through cooperation of rack and pinion or by means of spindles with left and right handed threads. Another kind uses wedge hook, chuck wherein a centering clamping slide is driven by a piston. Another approach uses a so called shift lever chuck but this is a rare way of approaching and in this case a vertical pin drives the centering clamping slide through an angularly or offset bent shift lever. Still another approach uses the so called spiral or scroll chuck wherein radially positioned centering chuck elements and slides are driven through a so called archimedic spiral.

The various approaches have their advantages for many particular fields but particularly where small workpieces have to be accommodated they all offer the following drawbacks. They are first of all relatively large and owing to the particular drive used in some of them, a particular stroke is needed that is insufficient. In case one uses a small configuration the stroke has to be small and depending on the kind of shift and motion deflection; the result is a rather limited field of employment. The spiral or scroll chuck theoretically permits a larger stroke but in order to obtain that, the spiral has to be rotated for considerable length and to a considerable extent that is very impractical when the drive is a hydraulic or pneumatic one.

Vertical level is not readily adjustable in the case of a centering vise and it is not possible to insert the vise structure into larger bores in a simple manner without exerting large tilting moments upon the brackets. Another drawback of known structures is the lack of variability concerning the number of brackets. From an overall point of view, sturdiness and power yield do in fact interfere with the complexity that is often inherent in the structure involved. For large units this may not be a significant drawback; but scaling down sensitive parts such as grips, hooks, angle levers, groove spirals and so forth offers unfortunate limitations in sturdiness and strength.

DESCRIPTION OF THE INVENTION

It is an object of the present invention to provide a new and improved power operated centering clamp or self centering clamp that is particularly amenable to a sturdy construction on a small scale, has a large variability and relatively speaking accommodates large forces as well as large strokes.

It is a particular object of the present invention to provide a new and improved power drive for elements which are to be moved and carry parts which will clampingly engage workpieces for self centering purposes.

In accordance with the preferred embodiment of the present invention, a rotating piston is acted upon through at least one tangentially acting drive piston to alternate rotation of the piston and on the front side of the turning piston two or more self centering slides radially or tangentially extending are provided for movement in opposite directions. The transfer or transmission of motion from the rotating piston to the centering clamping slides is carried out through key pins acting through and in oblong grooves or slots. In summary, a rotating piston with cam or key pins provides for a direct transmission between drive pistons on one hand and central clamping slides on the other hand.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 1a, 1b, 1c are respectively longitudinal sections, horizontal cross section from above (indicated by AA) and top elevation of a device unit and apparatus in accordance with the preferred embodiment of the present invention for practicing the best mode thereof using two tangentially operated centering clamping slides;

Figure 2A:
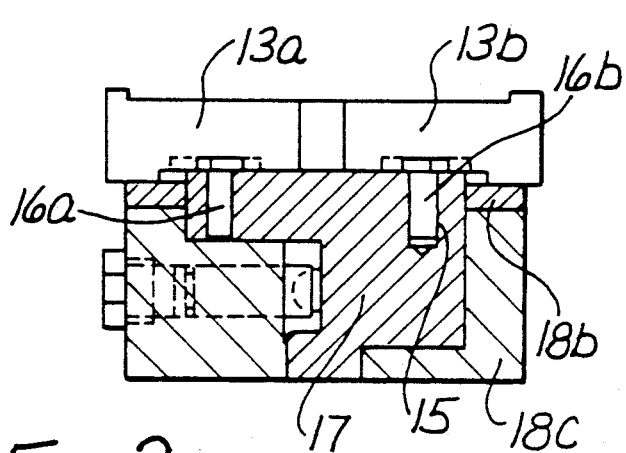
FIGS. 2a, 2b, and 2c are respectively also longitudinal sections, horizontal cross sections from above and top elevation of a unit having two radially operated centering clamping slides.

Proceeding now to the detailed description of the drawings, FIGS. 1a, b, c show a rotating piston 11 in a housing 1 and particularly in a cylindrical bore 1a of the housing. The piston 11 carries, on its front face, two tangentially movable centering clamping slides 2a and 2b which move in opposite directions. This can be specifically seen in FIG. 1c where the one slide 2a is shown to be up in the plane of the figure while the other one, 2b, has moved down. In terms of FIG. 1a the left hand slide 2a has moved in a direction down into the drawing, the right hand slide 2b has moved up with reference to the plane of the drawing. Two key pins 3a and 3b each with a round portion and with flat keying portions 4a and 4b each, serve as followers in order to transmit rotating motion as far as the piston 11 is concerned, as oppositely directed sliding motions of the two slides 2a and 2b.

The rotating piston 11 is operated by two linear working pistons 5 of hydraulic piston cylinder arrangements, there being piston chambers 6 accordingly, bolts with hexheads 36 close to chambers. Alternatingly pressurized oil is forced into one or the other of these chambers, so that the rotating piston 11 is either turned clockwise or counterclockwise. As can be seen in FIGS. 1b and 1c there has been a clockwise rotation of piston 11, if the lower piston chamber 6 were to be pressurized there would be counterclockwise motion. Here it should be considered that in principle one could use just one actuating piston 5 which is bidirectionally operated and provides a conversion of linear piston movement into a rotary motion of the rotating piston, in one or the opposite direction, but it is clear that a symmetrical arrangement is dynamically much more desirable.

The rotating piston 11 is rotatably mounted in a particular casing 1 and particularly in a zone or area which, so to speak, extends between the two slides 2a and 2b on one hand, and the two pistons 5 on the other hand. A journal and mounting pin 7 hold the rotating piston 11 vis-a-vis the housing 1 and rotates about the bore in housing 1 that is occupied by the pin 7. In order to obtain a highly compact construction the two pistons 5 are actually inserted from the side into the rotating piston, there being appropriate guides in the housing 1 serving in part as piston chamber 6.

The connection or operative connection between the linear pistons 5 on one hand and the rotating piston 11 on the other hand is preferably carried out through flattened balls 9 which are mounted respectively in front of the head of the pistons 5. These ball heads engage surface 10 which is in an axial plane and bisects the cross section of the piston 11 so that to the opposite side of the pistons 5 the cross section appears to be semi-circular as far as the rotating piston is concerned.

The pins 3a and 3b are inserted in bores of the slides 2a and 2b but also reach into and engage oblong grooves 12a and 12b in the front face of the piston 11. It can readily be seen that, as the piston 11 turns, the pins 3a, 3b move radially in opposite directions in the grooves 12a and 12b and thereby slide the two slides 2a and 2b in opposite directions. This arrangement permits a very low construction height and is thus highly instrumental in compactizing the construction. In centering positions, grooves 12a and 12b run transversely and exactly at right angles to the slides 2s and 2b and owing to the length of these slots 12, grooves or channels 12a and 12b, a relatively large stroke length is available for moving the two slides.

Figure 2B:
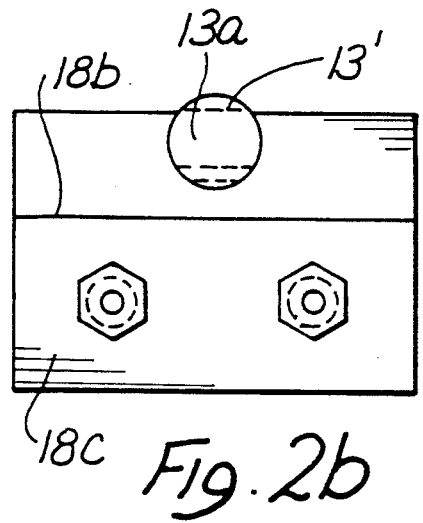
Figure 2C:
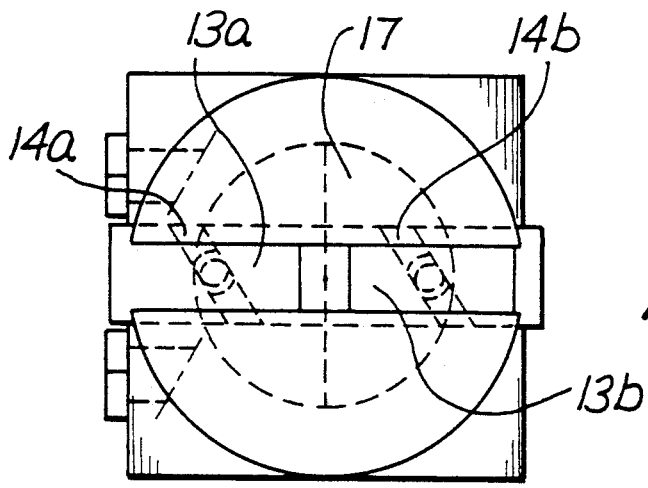

It can readily be seen that FIGS. 2a, 2b, 2c show a radially operating pair of slides 13a and 13b and is constructed similarly. These two slides 13a and 13b move on a radial line but in opposite directions rather than parallel to each other as far as the slide in FIG. 1a is concerned. These two slide elements 13a and 13b are of a basically pinlike configuration which are basically cylindrical but flattened in axial direction (see 13' in T). This two element arrangement shown in FIGS. 2a, b, c is designed for those cases wherein a relatively long guide structure is to be voided for the benefit of using the two-pins coaxial arrangement as illustrated.

Grooves 14a and 14b are provided in the slide elements 13a and 13b respectively. These grooves extend obliquely to the direction of sliding while the bores 15 for the follower pins 16 are arranged in this case in the rotating piston 17. By comparing FIGS. 1a, b, c with FIGS. 2a, b and c one can see that the axial construction length in FIG. 2a is particularly a little larger than in 1a. On the other hand the construction of the device in FIGS. 2a, b, c is somewhat simpler and sturdier as compared with the construction of FIGS. 1a, b, c. Owing to the radial displacement paths for the slides 13 and 13b, the grooves 14a and are oblique and do not register in a radial direction (as is the case for slots 12a, b in FIG. 1.

Figure 3:
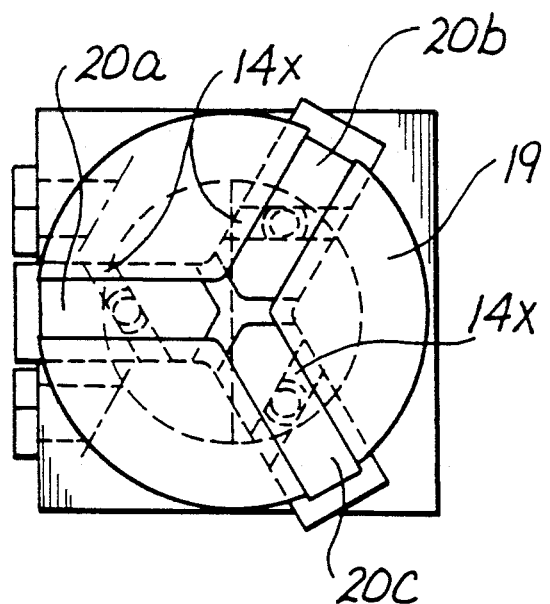
FIG. 3 illustrates a unit with three radially extending centering slides and chuck elements in top elevation.

The partitioning of the casing in a lower part 18a and an upper part 18b permits a ready exchange of the upper part for a smaller or larger one depending on the dimensions of the rotating piston. But what is more important is that one can exchange the arrangement that is inserted in casing 18a for an arrangement (19) shown in FIG. 3 wherein three slide elements 20a, 20b, 20c rather than two slide elements are to be accommodated. Owing to the fact that a rotating piston is used, any kind of loss in efficiency will not obtain on account of a higher or thicker arrangement of the upper part of the casing 18b. The arrangement of FIG. 3 is self explanatory. What is different are simply the groove patterns 14x, three grooves in the particular rotating piston but otherwise the operation piston, 5 just as in FIG. 1 is the same in FIGS. 2 as well as in FIG. 3.

Figure 4A:
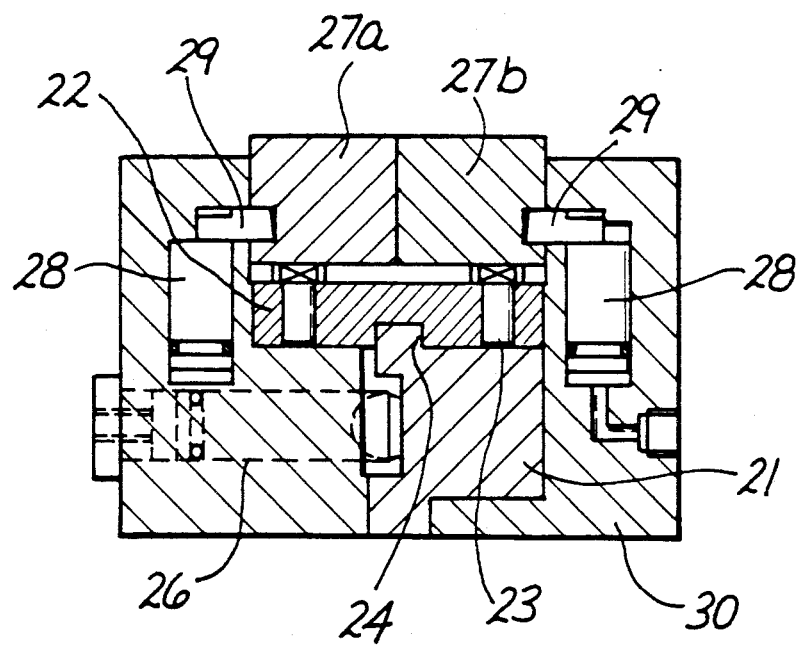
FIGS. 4a, 4b are respectively longitudinal sections and horizontal cross sections as seen from above a floating clamping structure.
Figure 4B:
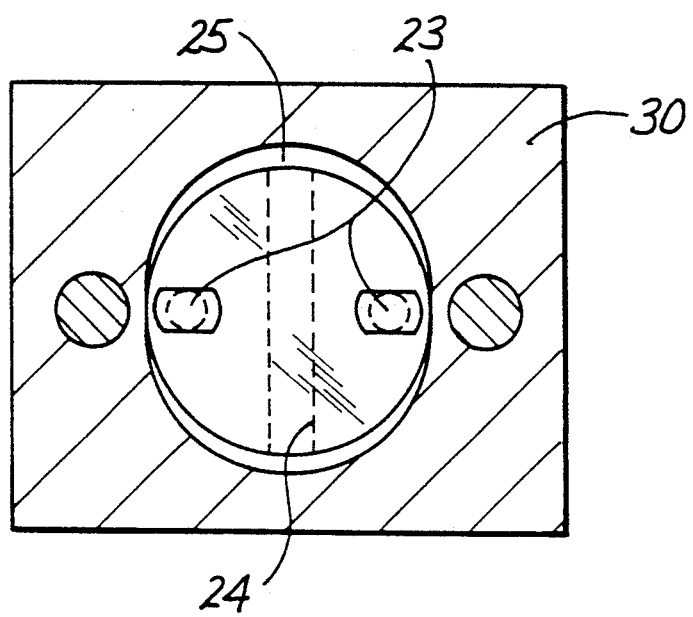

A floating clamp is obtainable through the construction shown in FIG. 4 wherein a two part rotating piston is used, the dividing plane is horizontal or transverse to the axis of rotation of the piston. The piston thus includes an upper part 22 which is basically provided for receiving the follow-up pins 23 and is also slidable on lower portions 21 through grooving and teeth 24. Space 25 is made available in the casing or housing 30 which deviates from a cylindrical bar and has an oval contour, as can be seen particularly in FIG. 4b. The lower part of the piston 21 is constructed basically similar to the type of rotating piston referred to above. There is of course a set of linearly acting drive pistons 5 for rotating pistons 21, 22.

Since the two pistons 5 act in the same manner as the other figures and turn rotating piston 21 in one or the opposite direction, the two slides 27a and 27b analogously to the slides 2a and 2b in FIG. 1, are extended until one of them hits the hollow interior of the workpiece. At that moment the piston part 22 not only continues to rotate but slides in the space 25 until the other one of the slides 27 also engages the workpiece. Only when both of these slides 27a, b engage the hollow workpiece more or less in opposite points will a clamping force be developed sufficient to clamp thereafter. This is particularly attainable through the small pistons 28 which act upon tilting pins 29 and hold everything in position against forces that are reacted into the equipment following the working.

The inventive arrangements as described in several embodiments above combine the following advantages. In all cases it can be seen that the construction height which is the axial length of the piston 1, 17, and 21/22 and the respective mounting structure (1a) including the slides (2a etc) on top of it, are very low. The low construction height is obtained particularly through positioning of these slides on the front face or faces of the piston. On the other hand the lateral engagement of that rotating piston with the linear drive pistons such as 5 does not extend the construction dimensions in axial direction. This is particularly important for noncontact work tools.

The overall construction moreover is sturdy and simple. Only simply configured and, therefore, economical parts are used. With the exception of the floating arrangement (FIGS. 4a and 4b) there is a single piece rotating piston, a single piece housing and relatively simple configured slides with key pins. It is an important aspect that the sturdiness of the overall construction does not suffer if the entire unit is to be made very small. The sturdiness of course has a direct bearing on safety, security and a long uselife.

Aside from the low construction height, the dimensions generally are quite small, which is another way of saying that the construction is very compact. The compactness, moreover, is due to the fact that the entire housing dimensions that contain the rotating piston is available as guide structure for the centering slides. A certain minimum length is important for general employment if slip-on chucks and brackets are being used.

The stroke length as well as the force available is rather high. Owing to the utilization of a rotating piston, even if the ratio of path lengths between drive input and output is about 1:1 that clamping stroke is indeed significant. Owing to the sturdy construction the forces the unit can resist are indeed very high, and that, of course, reflects in a very high available clamping force.

It can also be seen by comparing FIGS. 2a, b, c with FIG. 3, or by comparing FIGS. 4a, b, c with the other figures that in essence a building block principle is employed. The housing configuration can be the same for the different kinds of pistons as well as slide arrangements, and the piston/piston chamber 1a can be extended through the adding on of extension pieces. It is, in other words, possible to use in many instances certain parts and exchange others which means that once you go from a two to a three element structure one does not have to exchange the entire chuck. Also, for different pin and guidance structures one can use the same piston if the slots are in the slides and not in the piston. The exchange of some of the structures for a floating device has already been described.

The invention is not limited to the embodiments described above but all changes and modifications thereof, not constituting departures from the spirit and scope of the invention, are intended to be included.

We claim:

1. Power drive and transmission unit for self centering clamps and chucks comprising:
    a housing with a cylindrical bore;
    a piston having at least one end rotatably mounted in said housing for rotation in said bore the piston having an axis and a portion with a slot, the slot having an axially extending surface, the slot being between the one end of the piston and an opposite end;
    two linear operating, piston cylinder drives in said housing, the piston engaging said axial surface of said rotating piston in order to obtain rotation thereof in one or the opposite direction about said axis;
    at least two linearly moving central slide elements on said housing for obtaining the centering action and being positioned at said opposite end of the rotating piston; and
    pin means with flattened head means interconnecting said slide elements with said rotating piston, there being oblong slot means receiving the flattened head means of the pin means to convert the rotation of the rotating piston into motion of the slide elements, so that the slide elements move towards or away from a common center depending on the direction of rotation of the rotating piston.

2. Unit as in claim 1 there being a mounting and journalling pin extending from the one end of the rotating piston into said housing.

3. Unit as in claim 1 wherein the two linear pistons act on the rotating piston surface extending through the center of the rotating piston.

4. Unit as in claim 1 wherein said two linear pistons act through semispheres against said axially extending surface of the rotating piston.

5. Unit as in claim 1 wherein said oblong slots are in said slide elements, the pin means extending from the rotating piston.

6. Unit as in claim 1 wherein said oblong slots are in said rotating piston, said pin means extending from the slide elements.

7. Unit as in claim 1 there being two slides arranged next to each other for movement in parallel relation but in opposite directions.

8. Unit as in claim 1 wherein said slide elements are radially extending vis-a-vis the axis of said rotating piston and move towards or away from each other.

9. Unit as in claim 1 there being three slide elements moving towards and away from said common center, there being three operating pins accordingly.

10. Unit as in claim 1 said slides being flattened pins.

11. Unit as in claim 1 said housing having a lower part and an upper part.

12. Unit as in claim 1 said rotating piston being divided into two axially separated parts for floating adaptation wherein one part is strictly rotatably mounted and the other one is axially slidable transverse to the axis of rotation.

13. Unit as in claim 12, including a clamp for holding the slidable piston part in a clamping position.

14. Unit as in claim 5, the slots being readily aligned when the slides are in retracted position.

15. Unit as in claim 6, said oblong slots being in said slides oblique to the respective direction of sliding.

16. Unit as in claim 3, said semispheres being flattened so that they slide on said surface in said slot of said rotatable piston, upon turning of the rotating piston about its axis.

17. Power drive and transmission unit for self centering clamps and chucks comprising:
    a housing with a cylindrical bore;
    a piston rotatably mounted in said housing for rotation in said bore said rotating piston being divided into two axially separated parts for floating adaptation wherein one part is strictly rotatably mounted and the other one is axially slidable transverse to the axis of rotation;
    at least one, linear operating, piston cylinder drive in said housing, the piston engaging said rotating piston in order to obtain rotation thereof in one or the opposite direction;
    at least two linearly moving central slide elements on said housing for obtaining the centering action; and
    pin means interconnecting said slide elements with said rotating piston, there being oblong slot means receiving the pin means to convert the rotation of the rotating piston into motion of the slide elements, so that the slide elements move towards or away from a common center depending on the direction of rotation of the rotating piston.

18. Power drive and transmission unit for self centering clamps and chucks comprising:
    a housing with a cylindrical bore;
    a piston rotatably mounted in said housing for rotation in said bore, said piston having a slot the slot having an axially extending surface;
    two linear pistons acting on the rotating piston and on said surface of said piston, the linear pistons engaging said rotating piston through said surface in order to obtain rotation of the rotating piston in one or the opposite direction, said axially extending plane, extending through the center of the rotating piston;
    at least two linearly moving central slide elements on said housing for obtaining the centering action; and
    pin means interconnecting said slide elements with said rotating piston, there being oblong slot means receiving the pin means to convert the rotation of the rotating piston into motion of the slide elements, so that the slide elements move towards or away from a common center depending on the direction of rotation of the rotating piston.

* * * * *